United States Patent
Tsuchida

(10) Patent No.: US 10,277,811 B2
(45) Date of Patent: Apr. 30, 2019

(54) DISPLAY CONTROL DEVICE AND IMAGING DEVICE

(71) Applicant: OLYMPUS CORPORATION, Hachioji-shi, Tokyo (JP)

(72) Inventor: Ryusuke Tsuchida, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/822,402

(22) Filed: Nov. 27, 2017

(65) Prior Publication Data

US 2018/0077348 A1 Mar. 15, 2018

Related U.S. Application Data

(63) Continuation of application No. PCT/JP2016/062508, filed on Apr. 20, 2016.

(30) Foreign Application Priority Data

Jun. 2, 2015 (JP) .................................. 2015-112314

(51) Int. Cl.
*H04N 5/225* (2006.01)
*H04N 5/232* (2006.01)
(Continued)

(52) U.S. Cl.
CPC ........... *H04N 5/23229* (2013.01); *H04N 5/06* (2013.01); *H04N 5/208* (2013.01); *H04N 5/2258* (2013.01); *H04N 5/23293* (2013.01)

(58) Field of Classification Search
USPC ...................................................... 348/435.1
See application file for complete search history.

(56) References Cited

U.S. PATENT DOCUMENTS 6,144,362 A * 11/2000 Kawai ................ H04N 21/4316
345/629

FOREIGN PATENT DOCUMENTS

JP      10-108143 A      4/1998
JP      2009-231918 A   10/2009

OTHER PUBLICATIONS

International Search Report dated Jul. 26, 2016, issued in Counterpart of International Application No. PCT/JP2016/062508 (4 pages) w/English Translation.

* cited by examiner

*Primary Examiner* — Twyler L Haskins
*Assistant Examiner* — Dwight Alex C Tejano
(74) *Attorney, Agent, or Firm* — Westerman, Hattori, Daniels & Adrian, LLP

(57) ABSTRACT

A display control device, includes a plurality of image data-processing units acquiring and outputting image data; a synchronous signal generation unit generating and outputting a synchronous signal to a first image data-processing unit; a delay adjustment unit delaying first image data output from the first image data-processing unit for each line; a filter-processing unit performing a product-sum operation of a filter coefficient and a first partial image data; and a display image generation unit generating display image data by superimposing the filter-processing data on second image data, wherein the synchronous signal is a vertical synchronous signal included in each frame, the synchronous signal generation unit controls whether to output the synchronous signal to the first image data-processing unit earlier by a predetermined offset time, and the offset time corresponds to the number of taps and a line cycle and is within a range net exceeding a vertical retrace period.

5 Claims, 8 Drawing Sheets

(51) Int. Cl.
*H04N 5/06* (2006.01)
*H04N 5/208* (2006.01)

DISPLAY CONTROL DEVICE AND IMAGING DEVICE

This application is a continuation application based on a PCT International Application No. PCT/JP2016/062508, whose priority is claimed on Japanese Patent Application No. 2015-112314 filed on Jun. 2, 2015 in Japan. The contents of both of the PCT International Application and the Japanese Patent Application are incorporated herein by reference.

BACKGROUND OF THE INVENTION

Field of the Invention

The present invention relates to a display control device and an imaging device.

Description of Related Art

As an imaging device which captures an image such as a digital camera, an imaging device is known which performs various types of image processing on image data indicating captured images and displays a display image indicating display image data obtained through the image processing on a display device such as a display. For example, in an example shown in FIG. 7, an image-processing unit 940 generates moving image data, display image data 1, and display image data 2 which are re-sized depending on usage based on imago data from an imaging unit 920 (FIG. 9) and the image-processing unit 940 stores them in a memory. A moving image compression unit 950 stores compressed image data in the memory, the compressed image data being obtained by performing moving image compression processing on the display image data 1 read from the memory. Display control units 970-1 and 970-2 output the display image data 1 and 2 to display devices 20-1 and 20-2, respectively.

If a large amount of data is read from or written to a memory in parallel, it is difficult to ensure a bandwidth of a direct memory access bus (DMA bus, not shown) which connects the memory and each configuration element, and thus delay and congestion may occur. For example, there are cases in which a display image is displayed on the display device 20-1 while moving images of a 4K2K size (3840 pixels in a horizontal direction×2160 pixels in a vertical direction) are recorded. This is because the amount of DMA bus transfer data transferred via the DMA bus increases if the moving image data and the display image data 1 generated by the image-processing unit 940 are individually read from or written to each memory. In order to reduce the DMA bus transfer data, for example, the image-processing unit 940 does not generate the display image data 1 as shown in FIG. 8, and the display control unit 970-1 outputs the moving image data read from the memory to the display device 20-1.

On the other hand, in recent years, digital cameras having an edge-peaking function have been widely used. Edge peaking means image processing in which a predetermined edge emphasis color is superimposed on an image indicated by the image data in an edge area detected by causing a high-pass filter (HPF) to transmit data. By displaying an edge image obtained by the edge peaking on a display device, a user is notified of a position which is estimated to be in focus among captured images.

For example, the imaging device described in Japanese Unexamined Patent Application, First Publication No. 2009-231918 includes a peaking signal generation unit which generates a peaking signal from an input video signal, an operation unit which receives designation of a target area on which contour correction by a peaking signal is performed, and a control unit which generates an area gate signal describing position information corresponding to the designated area. The imaging device includes a mask-processing unit for outputting, based on an area gate signal, a video signal to which a peaking signal is added to the designated target area.

As shown in FIG. 8, display image data obtained by performing edge-peaking processing is also used as moving image data used for compression and recording. As shown in FIG. 9, an edge image is superimposed on not only a display image indicated by display image data to the display control units 970-1 and 970-2 but also an image indicated by moving image data output to the moving image compression unit 950. On the other hand, in order to output the display image data on which the edge image is superimposed from the display control units 970-1 and 970-2 as shown in FIG. 10, each of the display control units 970-1 and 970-2 requires an edge-peaking processing circuit which performs edge-peaking processing and a line memory which stores moving image data for adjusting a timing of superimposition with a generated edge image. Accordingly, a problem occurs that a hardware scale increases such that power consumption of the display control units 970-1 and 970-2 increases than the power consumption of a conventional digital camera.

SUMMARY OF THE INVENTION

According to a first aspect of the present invention, a display control device includes a plurality of image data-processing units configured to acquire image data from a DMA bus in synchronization with a synchronous signal and the plurality of image data-processing units being configured to output the image data, a synchronous signal generation unit configured to generate the synchronous signal and the synchronous signal generation unit being configured to output the synchronous signal to a first image data-processing unit which is one of the plurality of image data-processing units earlier than outputting the synchronous signal to a second image data-processing unit which is another image data-processing unit by a predetermined offset time, a delay adjustment unit configured to delay first image data for each line, the first image data being output from the first image data-processing unit, and the first image data being in synchronization with the synchronous signal, a filter-processing unit configured to perform a product-sum operation as filter processing by using a filter coefficient of a predetermined number of taps and a first partial image data output from the delay adjustment unit, and a display image generation unit configured to generate display image data by superimposing the filter-processing data on second image data from the second image data-processing unit, wherein the synchronous signal is a vertical synchronous signal included in each frame, the synchronous signal generation unit controls whether to output the synchronous signal to the first image data-processing unit earlier by a predetermined offset time in response to necessity of the filter processing, and the offset time is a time corresponding to the number of taps and a line cycle, and the offset time is within a range not exceeding a vertical retrace period determined by the vertical synchronous signal.

According to a second aspect of the present invention, in the display control device according to the first aspect, the plurality of the image data-processing units may output DMA request signals to the DMA bus in synchronization with a synchronous signal generated and input from the synchronous signal generation unit.

According to a third aspect of the present invention, an imaging device includes the display control device described in the first aspect.

According to a fourth aspect of the present invention, an imaging device includes the display control device described in the second aspect.

DETAILED DESCRIPTION OF THE INVENTION

<First Embodiment>

Next, embodiments of the present invention will be described with reference to the drawings.

Figure 1:
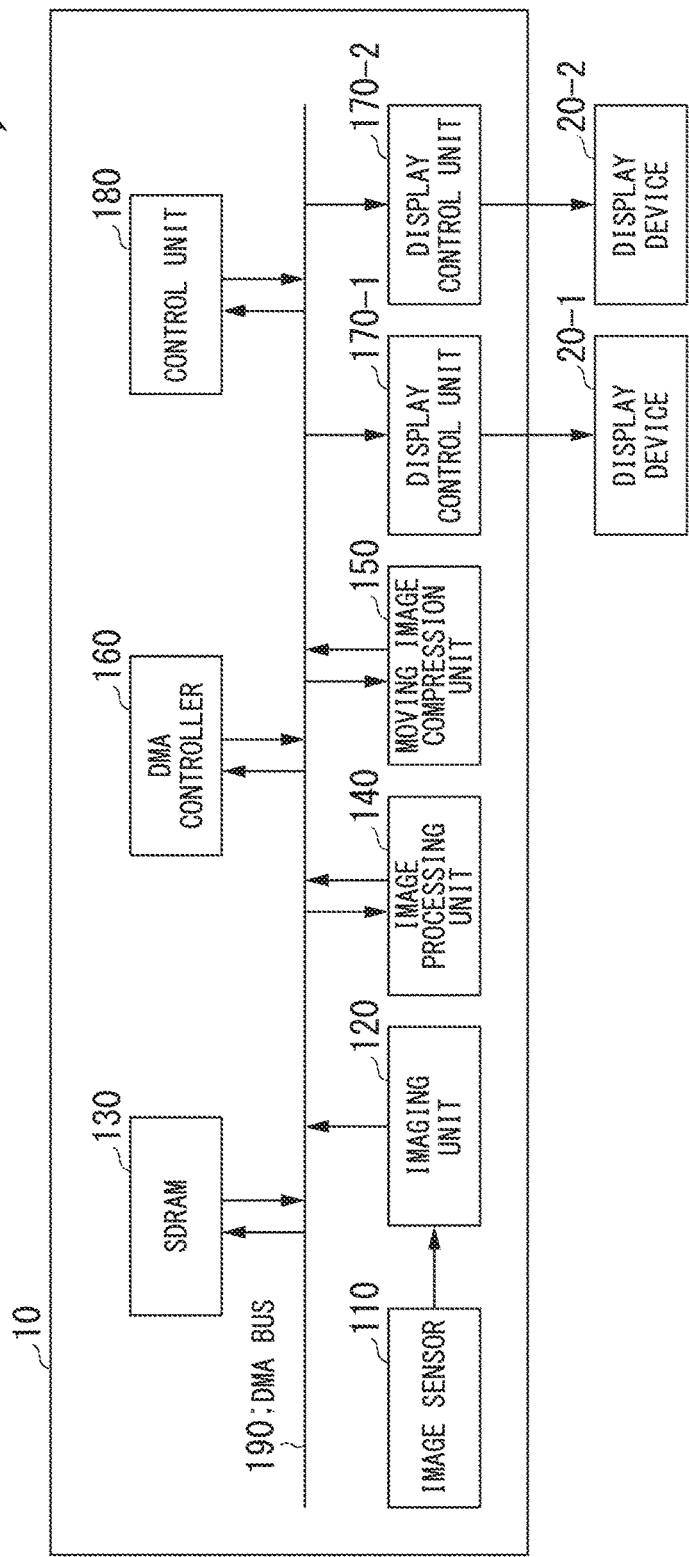
FIG. 1 is a schematic block diagram which shows a configuration of an imaging system according to a first embodiment.

FIG. 1 is a schematic block diagram which shows a configuration of an imaging system 1 according to the first embodiment the present invention. The imaging system 1 is configured to include an imaging device 10 and two display devices 20-1 and 20-2. The imaging device 10 is configured to include an image sensor 110, an imaging unit 120, a synchronous dynamic random access memory (SDRAM) 130, an image-processing unit 140, a moving image compression unit 150, a DMA controller 160, two display control units 170-1 and 170-2, and a control unit 180.

The image sensor 110 is an imaging element which captures an optical image of a subject image-formed on an imaging surface by a lens (not shown). In the image sensor 110, a plurality of light-receiving elements (pixels) are arranged on a two-dimensional imaging surface, and color filters having a Bayer array (Bayer arrangement) axe attached. Each light-receiving element converts incident light into a pixel signal which is an electric signal by photoelectric conversion, and each light-receiving element outputs a converted pixel signal to the imaging unit 120. The image sensor 110 is, for example, a charge-coupled device (CCD) image sensor, a complementary metal-oxide semiconductor (CMOS) image sensor, or the like.

The imaging unit 120 starts focusing (focus adjustment) and exposure in response to acquisition of the imaging start signal from the control unit 180. The imaging unit 120 adjusts a position of a lens to a position at which at least a portion of an optical image of a subject is image-formed on an imaging surface of the image sensor 110 by focusing. The imaging unit 120 samples an analog pixel signal input from the imaging element 111 every predetermined time (for example, 1/30 of a second) by exposure. The imaging unit 120 performs analog-to-digital (A/D) conversion on the sampled pixel signal to generate captured image data. The captured image data generated at this time is data indicating a Bayer image of each frame. The imaging unit 120 stores the generated captured image data in a SDRAM 130.

The SDRAM 130 is a storage unit which stores various types of data used for processing performed by a configuration element included in the imaging device 10 and various types of data generated through the processing. The SDRAM 130 is configured to include a storage medium. The storage medium can store and read various types of data in synchronization with processing performed by another configuration element (for example, the display control unit 170-1) of the imaging device 10 via the DMA bus 190.

The image-processing unit 140 reads captured image data newly stored in the SDRAM 130, and the image-processing unit 140 performs predetermined image processing on the read captured image data. The predetermined image processing includes processing such as γ correction, YC conversion, distortion correction, and noise removal. The γ correction is processing of correcting signal values for each pixel so that a change in brightness with respect to a change in the signal valves for each pixel is constant. The YC conversion is processing of generating brightness image data (Y image data) and color difference image data (C image data) for a captured image data generated by the γ correction. The color difference image data includes Cb image data indicating a Cb (color difference: blue) image and Cb image data indicating a Cb (color difference: blue) image. In the following description, unless specified otherwise, various types of image data generated by the image-processing unit 140 are collectively referred to as image data. The distortion correction is processing of correcting a deviation of coordinates of each pixel due to distortion caused by an optical system or the like. The noise removal is processing of removing or compressing a noise component super imposed on a signal value for the image data on which the distortion correction is performed.

The image-processing unit 140 re-sizes an image indicated by image data generated by predetermined image processing to a predetermined sire independently for each use, and the image-processing unit 140 generates image data for each use. The generated image data includes image data 1 and image data 3 which are subjected to moving image compression by the moving image compression unit 150. The image data 1 is output to the display control unit 170-1. The image data 3 is output from the display control unit 170-2. The image-processing unit 140 stores the generated image data 1 and 3 in the SDRAM 130. The image data 1 is read from the display control unit 170-1 in parallel. The image data 1 of a plurality of lines read in parallel is distinguished by being referred to as image data 2 in some cases.

The moving image compression unit 150 reads the image data 1 stored in the SDRAM 130. The moving image compression unit 150 performs moving image compression processing using a predetermined moving image compression method on the read image data 1, and the moving image compression unit 150 generates compressed image data. The predetermined moving image compression method is a method standardized by, for example, ISO/IEC 23008-2 high efficiency video coding (HEVC). The moving image compression unit 150 stores the generated compressed image data in the SDRAM 130.

The DMA controller 160 controls an input or an output of data between configuration elements connected to the DMA bus 190. For example, when a DMA request signal is input from the display control unit 170-1, the DMA controller 160 outputs a DMA request acceptance signal to the display control unit 170-1 which is a request source. The DMA request acceptance signal indicates acceptance of the DMA request signal. Next, the DMA controller 160 determines whether data designated by the DMA request signal can be read from the SDRAM 130. In the DMA request signal, information such as a type of data and an amount of data is designated. The DMA controller 160 outputs a DMA enable signal to the display control unit 170-1 which is a request source when it is determined that data can be read from the SDRAM 130. The DMA enable signal indicates that data designated by the DMA request signal can be read from the SDRAM 130. The DMA controller 160 reads an amount of information of the type of data designated by the DMA request signal corresponding to the designated amount. The DMA controller 160 generates DMA transfer data 1 including the read data and outputs the generated DMA transfer data 1 to the display control unit 170-1 which is a request source.

The display control unit 170-1 generates a synchronous signal and reads newly stored image data 1 and image data 2 which is the same as the image data 1 from the SDRAM 130 in synchronization with the generated synchronous signal. The display control unit 170-1 generates filter-processing on the read image data 2. The predetermined filter processing on the read image data 2. The display control unit 170-1 performs, for example, edge-peaking processing as predetermined filter processing, and generates edge image data indicating an edge image as filter-processing data. The display control unit 170-1 superimposes an image indicated by the image data 1 and an image indicated by filter-processing data in synchronization which each other. The display control unit 170-1 generates display image data 1 indicating a superimposed display image 1. The display control unit 170-1 outputs the generated display image data 1 to the display device 20-1.

The display control unit 170-2 reads newly stored image data 3 from the SDRAM 130. The display control unit 170-2 outputs the read image data 3 to the display device 20-2 as display image data 2.

The display control units 170-1 and 170-2 are, for example, data output interfaces. A configuration of the display control unit 170-1 will be described below.

The control unit 180 controls operations of configuration elements of the imaging device 10. The control unit 180 performs a start and an end of processing related to a function instructed in response to an operation input of a user, setting of a parameter used for processing of each configuration element, timing control of processing, and the like. A specific example of the control by the control unit 180 will be described in a description of a configuration element to be controlled.

The DMA bus 190 connects the imaging unit 120, the SDRAM 130, the image-processing unit 140, the moving image compression unit 150, the display control units 170-1 and 170-2, and the control unit 180, and the DMA bus 190 inputs and outputs various data between those configuration elements. The input and output of various types of data are controlled by the DMA controller 160.

The display device 20-1 displays a display image 1 indicated by the display image data 1 input from the display control unit 170-1. the display device 20-2 displays a display image 2 indicated by the display image data 2 input from the display control unit 170-2. Each of the display devices 20-1 and 20-2 is an electronic apparatus including a display device such as a display for displaying an image based on various types of image data. The display device 20-1 is, for example, a television receiver (TV). The display device 20-2 is, for example, a digital camera 90 built-in thin film transistor (TFT) liquid crystal display or an electronic view finder (EVF).

(Configuration of the Display Control Unit)

Next, a configuration of the display control unit 170-1 will be described.

Figure 2:
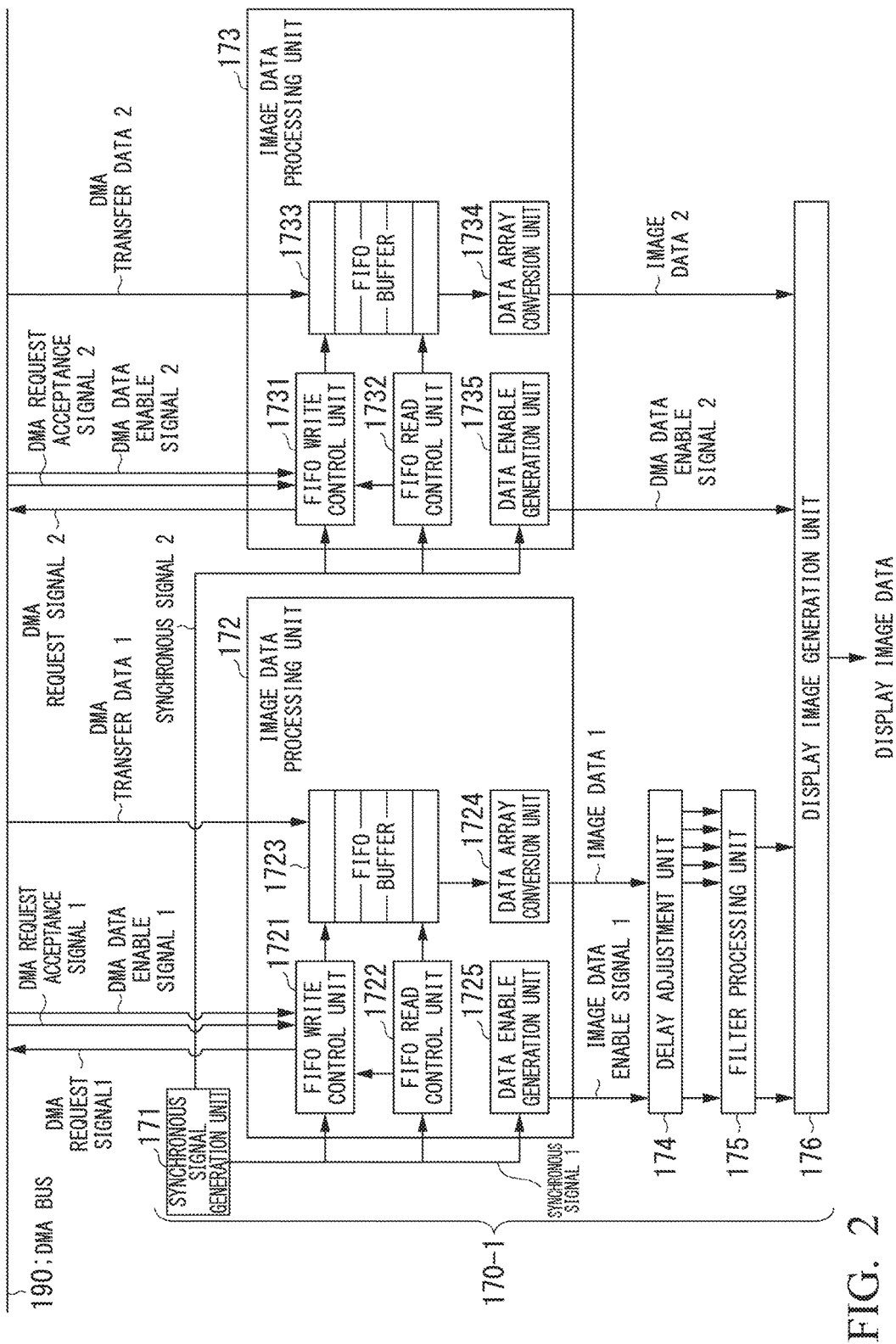
FIG. 2 is a schematic block diagram which shows an overall configuration of a display control unit according to the first embodiment.

FIG. 2 is a schematic block diagram which shows an overall configuration of a display control unit 170-1 according to the first embodiment. The display control unit 170-1 is configured to include a synchronous signal generation unit 171, two image data-processing units 172 and 173, a delay adjustment unit 174, a filter-processing unit 175, and a display image generation unit 176.

The synchronous signal generation unit 171 generates a synchronous signal indicating a reference of an operation timing of the display control unit 170-1. The generated synchronous signal is used as a reference of timing for the image data-processing units 172 and 173 reading the image data 1 and 2, respectively. The synchronous signal includes a vertical synchronous signal VD and a horizontal synchronous signal HD. The vertical synchronous signal VD is a signal inserted into a head of an image of each frame constituting a moving image. The horizontal synchronous signal HD is a signal inserted into a head of each line constituting the image of each frame. Accordingly, the vertical synchronous signal VD is set in a frame cycle, and the horizontal synchronous signal HD is set in a line cycle. The synchronous signal generation unit 171 outputs a generated synchronous signal to the image data-processing unit 172 as a synchronous signal 1, and the synchronous signal generation unit 171 outputs the generated synchronous signal to the image data-processing unit 173 as a synchronous signal 2. An output timing of the synchronous signal 1 is earlier than an output timing of the synchronous signal 2 by a predetermined offset time. The predetermined offset time is time for the filter-processing unit 175 to cancel a delay time related to generation of filter-processing data 1 (to be described) based on the image data 1.

The image data-processing unit 172 sequentially reads image data 1 from the SDRAM 130 in synchronization with the synchronous signal 1 transferred from the synchronous signal generation unit 171. The image data-processing unit 172 outputs the read image data 1 to the delay adjustment unit 174. The image data-processing unit 172 generates an image data enable signal 1 in synchronization with the synchronous signal 1, and the image data-processing unit 172 outputs the image data enable signal 1 to the delay adjustment unit 174. The image data enable signal 1 indicates that the image data 1 can be used. The image data-processing unit 172 is configured to include a first-in first-out write (FIFO write) control unit 1721, a FIFO read control unit 1722, a FIFO buffer 1723, a data array conversion unit 1724, and a data enable generation unit 1725.

The FIFO write control unit 1721 controls reading of the image data 1 from the SDRAM 130 and writing into the FIFO buffer 1723 in synchronization with the synchronous signal 1 transferred from the synchronous signal generation unit 171. Specifically, the FIFO write control unit 1721 repeats the following processing S01 to S08. (S01) The FIFO write control unit 1721 determines whether to detect a vertical synchronous signal VD indicating a head of each frame from the synchronous signal 1. The FIFO write control unit 1721 proceeds to processing of S02 when the vertical synchronous signal VD is detected, and repeats processing of S01 when the vertical synchronous signal VD is not detected. (S02) The FIFO write control unit 1721 generates a DMA request signal 1 and outputs the generated DMA request signal 1 to the DMA controller 160. The DMA request signal 1 indicates image data 1 which has not been read yet. A data amount indicated by the DMA request signal 1 is a data amount smaller than a data amount corresponding to one line, for example, a data amount representing a signal value for each of the predetermined number of pixels. (S03) The FIFO write control unit 1721 detects a data amount of data stored in the FIFO buffer 1723 when a DMA request acceptance signal is input from the DMA controller 160 as a response. (S04) The FIFO write control unit 1721 determines whether the detected data amount reaches a filled state (full state). The filled state (full state) is a state in which the image data 1 from the DMA controller 160 is stored to reach an upper limit of a capacity of storage in the FIFO buffer 1723. (S05) The FIFO write control unit 1721 causes the image data 1 (DMA transfer data 1) from the DMA controller 160 to be stored in a storage area of a head of the FIFO buffer 1723 when the DMA data enable signal 1 is input from the DMA controller 160. (S06) The FIFO write control unit 1721 repeats the processing of S02 to S05 what it is determined that the full state is not reached. (S07) The FIFO write control unit 1721 stops the processing of S02 to S05 and proceeds to processing of S08 when it is determined that the full state is reached. (S08) When a data read signal indicating that the image data 1 has been read is input from the FIFO read control unit 1722, the FIFO write control unit 1721 returns to the processing of S02.

The FIFO read control unit 1722 controls reading of the image data 1 stored in the FIFO buffer 1723 in synchronization with the synchronous signal 1 transferred from the synchronous signal generation unit 171. Specifically, the FIFO read control unit 1722 repeats the following processing S11 to S13. (S11) The FIFO read control unit 1722 determines whether to detect a horizontal synchronous signal HD indicating a head of each line from the synchronous signal 1. The FIFO read control unit 1722 proceeds to processing of S12 when it is determined that the horizontal synchronous signal HD is detected. The FIFO read control unit 1722 repeats the processing of S11 (standby) when it is determined that the horizontal synchronous signal HD is not detected. (S12) The FIFO read control unit 1722 causes image data 1 first stored in the FIFO buffer 1723 to be output to the data array conversion unit 1724. A data amount of image data 1 output by the FIFO read control unit 1722 at one time is the data amount corresponding to one line or a data amount smaller than the data amount. (S13) The FIFO read control unit 1722 generates a data read signal indicating that the image data 1 has bean read, and outputs the data read signal to the FIFO buffer 1723. Thereafter, the processing returns to the processing of S11.

The FIFO buffer 1723 is a storage medium that temporarily stores input data and preferentially outputs data with an earlier input time among the stored data. The FIFO buffer 1723 sequentially stores image data 1 from the DMA controller 160 which is input according to control of the FIFO write control unit 1721. The FIFO buffer 1723 sequentially outputs the stored image data 1 to the data array conversion unit 1724 in response to an input of a data read signal from the FIFO read control unit 1722. The FIFO buffer 1723 erases the output image data 1 and ensures a storage area for new image data 1.

The data array conversion unit 1724 converts a data array of the signal values for each pixel into a data array in accordance with an order of pixels arranged in a display image (raster scan order). The data array of the signal values for each pixel forms the image data 1 input from the FIFO buffer 1723. The data array conversion unit 1724 outputs the image data 1 obtained by converting the data array to the delay adjustment unit 174 for each line.

The data enable generation unit 1725 generates a data enable signal 1 in synchronization with the synchronous signal 1 transferred from the synchronous signal generation unit 171. The data enable signal 1 indicates that the image data 1 output from the data array conversion unit 1724 can fee used. Specifically, the data enable generation unit 1725 repeats the following processing S21 and S22. (S21) The data enable generation unit 1725 determines whether to detect the horizontal synchronous signal HD indicating a head of each line from the synchronous signal 1. The FIFO read control unit 1722 proceeds to processing of S22 when it is determined that the horizontal synchronous signal HD is detected. The FIFO read control unit 1722 repeats the processing of S21 (stands by) when it is determined that the horizontal synchronous signal HD is not detected. (S22) The data enable generation unit 1725 outputs the data enable signal 1 to the delay adjustment unit 174. The data enable signal 1 generates image data 1 for each line obtained by converting the data array by the data array conversion unit 1724. Thereafter, the data enable generation unit 1725 returns to the processing of S21.

The image data-processing unit 173 sequentially reads image data 2 the same as the image data 1 from the SRAM 130 in synchronization with the synchronous signal 2 transferred from the synchronous signal generation unit 171, and the image data-processing unit 173 outputs the image data 2 to the delay adjustment unit 174. The image data-processing unit 173 generates an image date enable signal 2 in synchronization with the synchronous signal 2 and the image data-processing unit 173 outputs the image data enable signal 2 to the display image generation unit 176. The image data enable signal 2 indicates that the image data 2 can be used. The image data-processing unit 173 is configured to include a FIFO write control unit 1731, a FIFO read control unit 1732, a FIFO buffer 1733, a data array conversion unit 1734, and a data enable generation unit 1735. Configurations of the FIFO write control unit 1731, the FIFO read control unit 1732, the FIFO buffer 1733, the data array conversion unit 1734, and the data enable generation unit 1735 are the same as the configurations of the FIFO write control unit 1721, the FIFO read control unit 1722, the FIFO buffer 1723, the data array conversion unit 1724, and the data enable generation unit 1725, respectively.

The image data enable signal 1 and the image data 1 are input to the delay adjustment unit 174 from the image data-processing unit 172. The delay adjustment unit 174 delays a delay of the image data 1 in line units in synchronization with the image data enable signal 1, and the delay adjustment unit 174 generates image data 1 corresponding to 2N+1 lines (M is a natural number of one or more). The delay adjustment unit 174 outputs the image data 1 corresponding to 2N+1 lines to the filter-processing unit 175. 2N+1 delay time includes a delay time 0 (no delay).

The image data enable signal 1 from the image data-processing unit 172 and image data 1 of the 2N+1 delay time from the delay adjustment unit 174 are input to the filter-processing unit 175. The filter-processing unit 175 performs filter processing on the image data 1 corresponding to 2N+1 lines in line units in synchronization with the image data enable signal 1, and the filter-processing unit 175 generates filter-processing data 1. The filter-processing unit 175 outputs the generated filter-processing data 1 to the display image generation unit 176. The filter processing performed by the filter-processing unit 175 will be described below.

The image data enable signal 1 and the filter-processing data 1 are input to the display image generation unit 176 from the filter-processing unit 175. The image data enable signal 2 and the image data 2 are input to the display image generation unit 176 from the image data-processing unit 173. The display image generation unit 176 superimposes an image indicated by the filter-processing data 1 on an image indicated by the image data 2 in synchronization with the image data enable signals 1 and 2. The display image generation unit 176 generates display image data 1 indicating the superimposed image. The display image generation unit 176 outputs the generated display image data 1 to the display device 20-1.

(Filter Processing, Superimposition)

Next, filter processing in the filter-processing unit 175 and superimposition processing in the display image generation unit 176 will be described.

Figure 3:
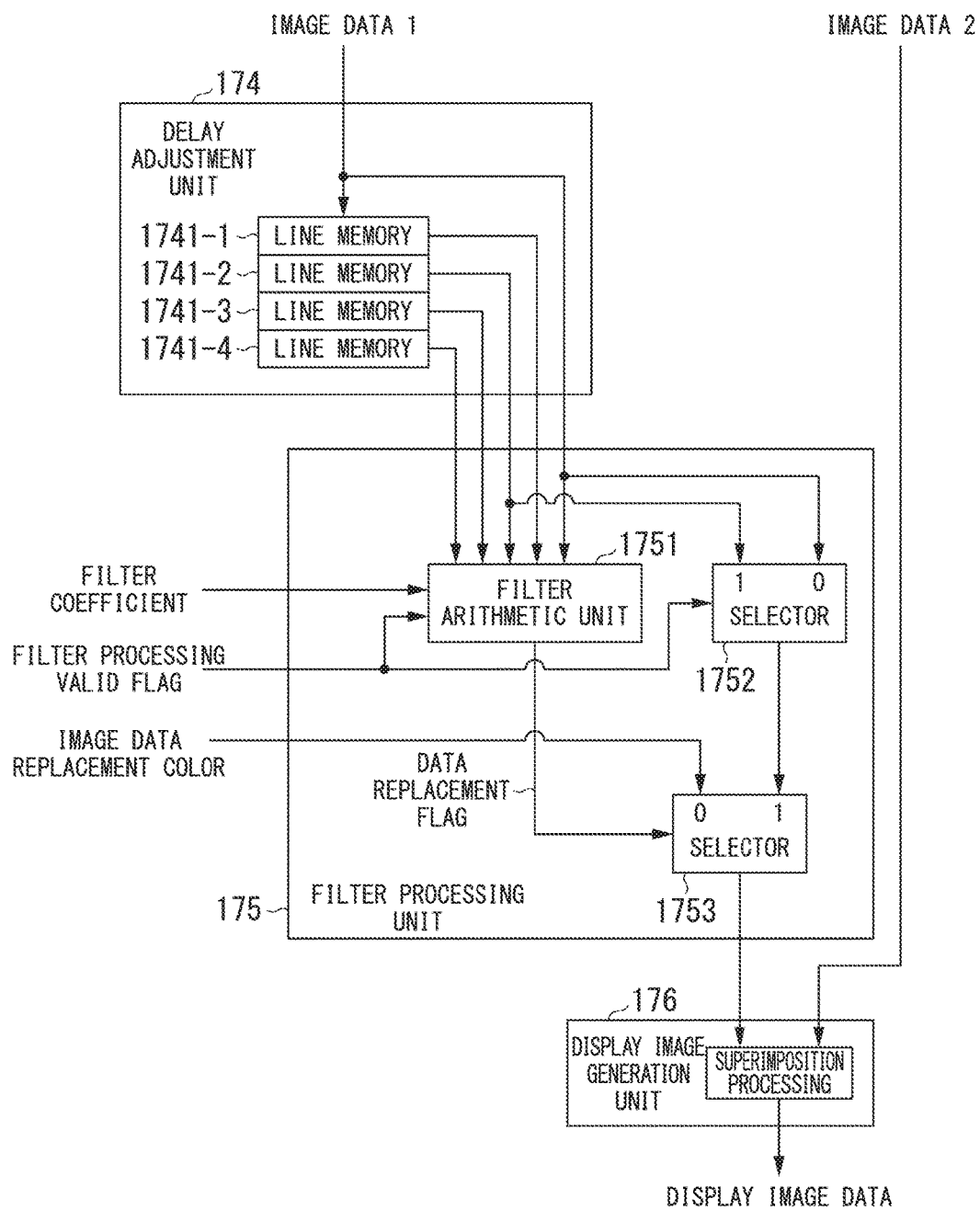
FIG. 3 is a schematic block diagram which shows a partial configuration of the display control unit according to the first embodiment.

FIG. 3 is a schematic block diagram which shows a partial configuration of the display control unit 170-1 according to the present embodiment. In FIG. 3, the synchronous signal generation unit 171, the image data-processing units 172 and 173, and the image data enable signals 1 and 2 are not shown. In the following description, a case in which filter processing performed by the filter-processing unit 175 is edge-peaking processing including a product-sum operation using a filter coefficient of one-dimensional 5 taps (N=2) will be described as an example.

The delay adjustment unit 174 is configured to include four line memories 1741-1 to 1741-4. Each of the line memories 1741-1 to 1741-4 is a storage medium which stores image data 1 for each line. In the delay adjustment unit 174 described above, the image data enable signal 1 is input for each line. When an input of the image data enable signal 1 is detected, each of the line memories 1741-1 to 1741-4 outputs the image data 1 stored therein to the filter-processing unit 175, respectively. Thereafter, each of the line memories 1741-1 to 1741-3 transfers the image data 1 stored therein to the line memories 1741-2 to 1741-4, respectively. The line memory 1741-1 stores image data 1 newly input from the image data-processing unit 172. This newly input image data 1 is further output to the filter-processing unit 175. Accordingly, the delay adjustment unit 174 outputs image data 1 which is 0 to 4 line cycle delayed to the filter-processing unit 175 as image data 1 delayed in line units.

The filter-processing unit 175 is configured to include a filter operation unit 1751 and two selectors 1752 and 1753. When an input of an image data enable signal 1 from the image data-processing unit 172 is detected, the image data 1 delayed in line units by the delay adjustment unit 174 is input to the filter operation unit 1751. Image data 1 which is not delayed and image data 1 which is two-line delayed are input to the selector 1752.

A filter processing valid flag having a value indicating whether to perform filter processing is set by the control unit 180 (refer to FIG. 1) in the filter operation unit 1751. A filter processing valid flag value of 1 indicates that the filter processing is to be performed, and a filter processing valid flag value of 0 indicates that the filter processing is not to be performed. When the filter processing valid flag value of 1 is set, the filter operation unit 1751 performs a product-sum operation using a filter coefficient for each line set by the control unit 180 on the image data 1 delayed in line units.

The filter operation unit 1751 functions as a 5-tap filter. That is, the filter operation unit 1751 multiplies signal values for each pixel indicated by the image data 1 which is 0 to 4 line cycle delayed by five set filter coefficients. Then, the filter operation unit 1751 calculates a sum of multiplied values for each pixel obtained by the multiplication between lines for each pixel. The filter operation unit 1751 functions as a high-pass filter which transmits more high-frequency components with a spatial frequency higher than a predetermined frequency than low-frequency components with a lower spatial frequency according to a set filter coefficient. As data representing the high-frequency components, data delayed with a delay time of two line cycles from the image data 1 is obtained. The delay time of two line cycles is a median value of delay of 0 to 4 line cycles. The filter operation unit 1751 generates a data replacement flag obtained by calculating a sum. The data replacement flag indicates whether a signal value of each pixel is larger than a threshold value of a predetermined signal value. A value indicated by the data replacement flag is one for pixels whose signal values are larger than the threshold value, and is zero for the other pixels. That is, an area made of the pixels with the data replacement flag value of one indicates an area of an edge in which the high-frequency components are main components in the image data 1. The filter operation unit 1751 outputs the generated data replacement flag to a selector 1753.

When the filter processing valid flag value is zero, the filter operation unit 1751 does not perform the filter processing. In this case, the data replacement flag is not generated.

The filter processing valid flag is input from the control unit 180. The selector 1752 selects the image data 1 which is not delayed when the filter processing valid flag value is zero. The selector 1752 selects the image data 1 which is two line cycle delayed when the filter processing valid flag value is one. This two line cycle delay corresponds to a delay time caused by the filter processing described above. The selector 1752 outputs the selected image data 1 to the selector 1753. When the filter processing is not performed, the image data 1 which is not delayed is selected without passing through the line memories 1741-1 to 1741-4. Accordingly, it is possible to suppress unnecessary power consumption by stopping supply of power to the line memories 1741-1 to 1741-4.

The selector 1753 selects the pixels with the data replacement flag value of 1 among signal values for each pixel indicated fey by data 1. The image data 1 is input from the selector 1752. The data replacement flag is input from the filter operation unit 1751. The selector 1753 replaces signal values of the selected pixels with a signal value which gives a predetermined image data replacement color (for example, orange) input from the control unit 180. Accordingly, signal values of unselected pixels are maintained. The selector 1753 outputs filter-processing data 1 indicating the signal values of each replaced pixel and the signal values of each of the other pixels excluding the replaced pixels to the display image generation unit 176.

The image data enable signals 1 and 2 (refer to FIG. 2) are input to the display image generation unit 176 for each line. When an input of the image data enable signal 1 is detected, the filter-processing data 1 is input to the display image generation unit 176 from the filter-processing unit 175. When an input of the image data enable signal 2 is detected, the image data 2 is input to the display image generation unit 176 from the image data-processing unit 173 (refer to FIG. 2). The display image generation unit 176 generates the display image data 1 by performing superimposition processing based on the filter-processing data 1 on the image data 2. The display image generation unit 176 determines whether a signal value indicated by the image data 2 is equal to a signal value indicated by the filter-processing data 1 for each pixel. The display image generation unit 176 replaces the signal value indicated by the image data 2 of a pixel which is determined to be different from the signal value indicated by the filter-processing data 1 with the signal value of the pixel indicated by the filter-processing data 1. The display image generation unit 176 outputs the display image data 1 indicating the replaced signal value to the display device 20-1.

(Timing of Data)

Figure 4:
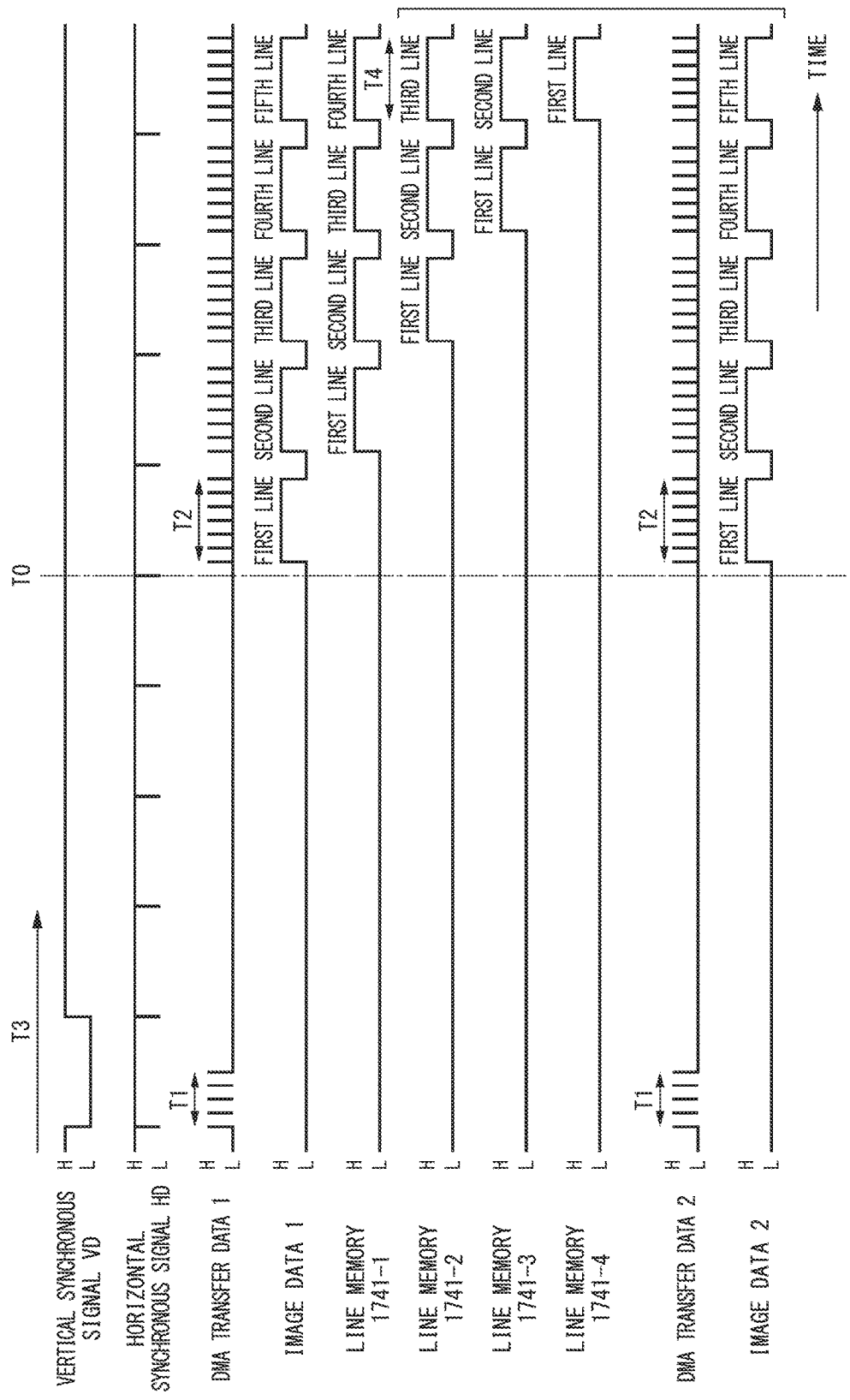
FIG. 4 is a timing chart which shows an example of output data.
Figure 5:
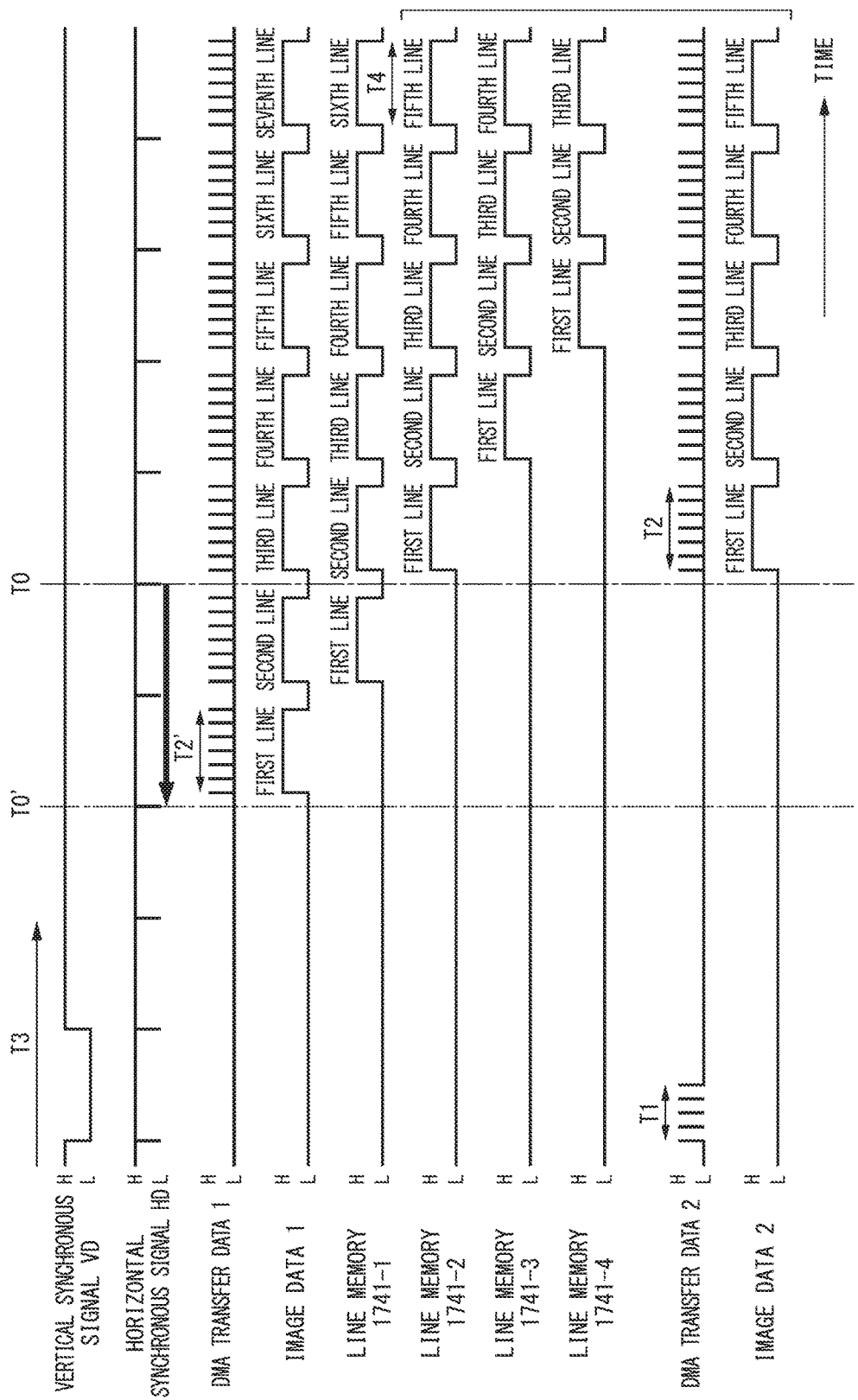
FIG. 5 is a timing chart which shows an example of output data.

Next, a timing of output data from each configuration element of the display control unit 170-1 will be described using FIGS. 4 and 5. In FIGS. 4 and 5, an example in which the synchronous signal generation unit 171 outputs a vertical synchronous signal VD and a horizontal synchronous signal HD as synchronous signals 1 and 2 will be described. FIG. 4 shows an example of outputting the synchronous signals 1 and 2 at the same time, and FIG. 5 describes an example of outputting the synchronous signal 1 two lines earlier than the synchronous signal 2. However, the synchronous signal 1 is not shown in FIG. 5. The vertical synchronous signal VD shown in the first row of FIGS. 4 and 5 is a signal representing a head of each frame by a low voltage value (L) which is lower than a predetermined voltage (corresponding to a high voltage value (H)) in the other sections. The horizontal synchronous signal HD shown in a second row is a signal representing a head of each line by the low voltage value (L) and representing the other portions by the high voltage value (H). The vertical synchronous signal VD is placed in a vertical retrace period T3. The vertical retrace period T3 is a period in which data indicating the signal value of each pixel in the head of each frame of the image data 1 is not included. The vertical retrace period T3 is also referred to as a vertical blanking period. The vertical retrace period T3 is interposed between periods including signal values of respective pixels belonging to different frames. In the examples shown in FIGS. 4 and 5, the DMA transfer data 1 and 2, the image data 1 and 2, and the line memories 1741-1 to 1741-4 each have a portion of data indicating a significant signal value represented by the high voltage value (H), wherein the other portions being represented by the low voltage value (L).

A section T1 in FIGS. 4 and 5 starts at the head of a frame. The section T1 is a section in which the high voltage value (H) of the DMA transfer data 1 is repeated. This repetition indicates that the FIFO write control unit 1721 repeats the processing of S02 to S05 in advance until the FIFO buffer 1723 reaches the full state.

In a section T2 starting immediately after a time T0, image data 1 of a first line from the image data-processing unit 172 is output from the FIFO buffer 1723 via the data array conversion unit 1724. At this time, an empty area occurs in the FIFO buffer 1723. The FIFO write control unit 1721 repeats the processing of S02 to S05 until the FIFO buffer 1723 reaches the full state. Then, in a section of a next line, image data 1 of a first line is output from the line memory 1741-1 of the delay adjustment unit 174 and image data 1 of a second line is output from the image data-processing unit 172. The FIFO write control unit 1721 repeats the processing of S02 to S05 until the FIFO buffer 1723 reaches the full state. When a series of processing is repeated for three lines, image data 1 of first to fifth lines is output from the delay adjustment unit 174.

In the example shown in FIG. 4, the image data-processing unit 173 outputs image data 2 in synchronization with a timing at which the image data-processing unit 172 outputs image data 1. The display image generation unit 176 superimposes the image data 2 from the image data-processing unit 173 on the filter-processing data 1. The filter-processing data 1 is generated based on the image data 1 which is two line cycle delayed with respect to the image data 2. For example, the filter-processing data 1 and the image data 2 of the fifth line from the image data-processing unit 173 are output in a section T4. The filter-processing data 1 is generated based on the image data 1 of a third line output from the line memory 1741-2 of the delay adjustment unit 174.

In the present embodiment, the synchronous signal generation unit 171 outputs the synchronous signal 1 to the image data-processing unit 172 earlier than the image data-processing unit 173 by a time corresponding to two line cycles as a predetermined offset time. Accordingly, at a time T0' earlier than the time T0 by two line cycles, the image data-processing unit 172 starts output of image data 1. Therefore, without including an additional line memory for timing adjustment, the image data 2 from the image data-processing unit 173 can be superimposed on the filter-processing data 1 based on the image data 1 at the same timing. For example, the filter-processing data 1 of the fifth line from the line memory 1741-2 of the delay adjustment unit 174 and the image data 2 of the fifth line from the image data-processing unit 173 are output in the section T4. Since the vertical synchronous signal VD included in the synchronous signal 1 included in the synchronous signal 1 is included in the vertical retrace period T3 in which a signal value of each pixel is not disposed in the image data 2 even two line cycles earlier, the image data-processing units 172 and 173 can process the image data 1 and 2 indicating an image of a common frame.

In the example described above, an example in which N equals to a value of two is described, but the present invention is not limited thereto. As long as N is a natural number of 1 or more, N may be 1 or 3 or more. However, an offset time giving N requires that the vertical synchronous signal VD of the synchronous signal 1 preferably not exceed the vertical retrace period T3 of the synchronous signal 2. The vertical synchronous signal VD of the synchronous signal 1 is within the vertical retrace period T3 of the synchronous signal 2, and thereby it is possible to set frames of the image data 1 and 2 to be processed as common frames between the image data-processing units 172 and 173 and to avoid processing between different frames.

As described above, the display control unit 170-1 of the imaging device 10 according to the present embodiment includes a plurality of image data-processing units 172 and 173 which acquire the image data 1 and 2 and output the image data 1 and 2 in synchronization with the synchronous signals 1 and 2, respectively. The display control unit 170-1 includes the synchronous signal generation unit 171 which generates the synchronous signals 1 and 2, and outputs the generated synchronous signal 1 to the image data-processing unit 172 earlier than the image data-processing unit 173 which is an output destination of the synchronous signal 2 by a predetermined offset time. The offset time is a time for cancelling a delay time related to the generation of the filter-processing data 1 from the image data 1. The display control unit 170-1 delays the image data 1 from the image data-processing unit 172 for each line. The display control unit 170-1 includes the filter-processing unit 175 which generates the filter-processing data 1 by performing the filter processing on the image data 1 from the delay adjustment unit 174. The display control unit 170-1 includes the display image generation unit 176 which generates the display image data 1 by superimposing the filter-processing data 1 on the image data 2 from the image data-processing unit 173.

In the example shown in FIG. 4, it is also considered that the display control unit 170-1 includes a line memory for timing adjustment of the image data 2 in the image data-processing unit 173, but an amount of power consumption increases. With the configuration of the display control unit 170 according to the present embodiment, it is possible to superimpose the image data 2 and the filter-processing data 1 at the same timing without including the line memory for timing adjustment of the image data 2. Accordingly, it is possible to prevent recording of the filter-processing data 1 generated by the filter processing and suppress an increase in hardware scale. The display control unit 170-1 can reduce power consumption by omitting the line memory for timing adjustment of the image data 2.

In the display control unit 170-1, as the filter processing, the filter-processing unit 175 performs a product-sum operation on a filter coefficient of the predetermined number of taps (2N+1) and image data 1 which is delayed by a corresponding delay time. The offset time is a time corresponding to N times the number of taps of a line cycle.

With such a configuration, delay of N times a line cycle caused by the product-sum operation in line units and an offset time are cancelled. Accordingly, it is possible to superimpose the image data 2 and the filter-processing data 1 obtained by the product-sum operation at the same timing without including the line memory for timing adjustment of the image data 2.

In the display control unit 170-1, the synchronous signal generation unit 171 controls whether to output a generated synchronous signal to the image data-processing unit 172 earlier than outputting the generated synchronous signal to the image data-processing unit 173 by a predetermined offset time in response to necessity of the filter processing in the filter-processing unit 175.

With such a configuration, it is possible to superimpose the image data 1 or the filter-processing data 1 obtained from the filter-processing unit 175 on the image data 2 at the same timing regardless of the necessity of the filter processing without including the line memory for timing adjustment of the image data 2. When the filter processing is not performed, it is possible to reduce power consumption by stopping an operation of line memories configuring the delay adjustment unit 174.

The synchronous signals 1 and 2 generated by the synchronous signal generation unit 171 have a vertical synchronous signal VD for each frame. An offset time which gives an output timing of the synchronous signal 1 requires that the vertical synchronous signal VD of the synchronous signal 1 not exceed a vertical retrace period. The vertical retrace period is a section which includes a vertical synchronous signal VD in the image data 2 and does not have a signal value of each pixel.

With such a configuration, a frame to be processed between the image data 1 and 2 is commonized in the image data-processing units 172 and 173 to be processed, and thereby it is possible to avoid processing between image data 1 and 2 having different frames.

<Second Embodiment>

Next, a second embodiment will be described. The same constituents as in the first embodiment are given the same reference numerals and description thereof can be referred to.

An imaging device 10A (not shown) according to the present embodiment includes a display control unit 170A-1 instead of the display control unit 170A-1 in the imaging device 10.

Figure 6:
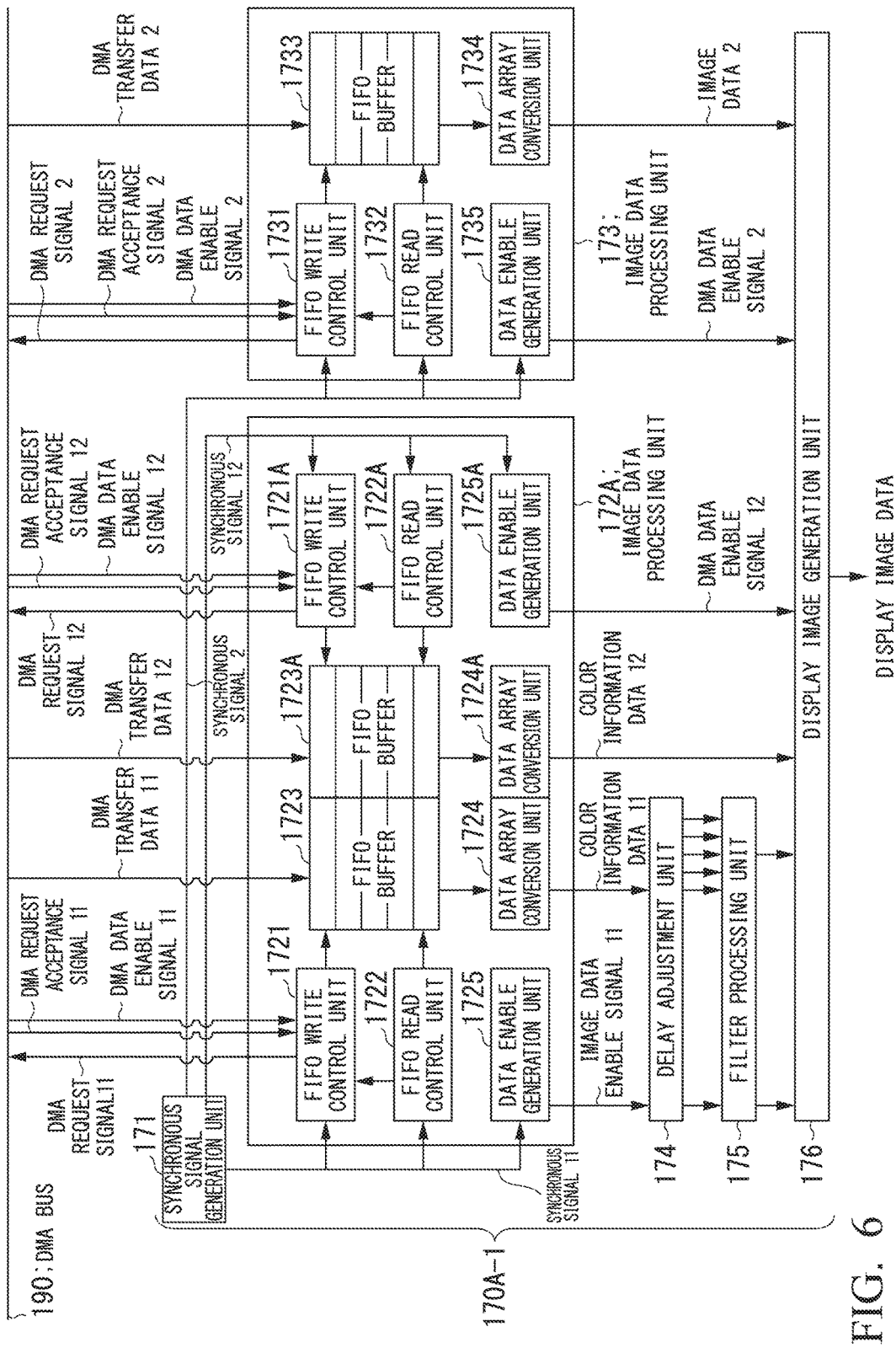
FIG. 6 is a schematic block diagram which shows a configuration of a display control unit according to a second embodiment.
Figure 7:
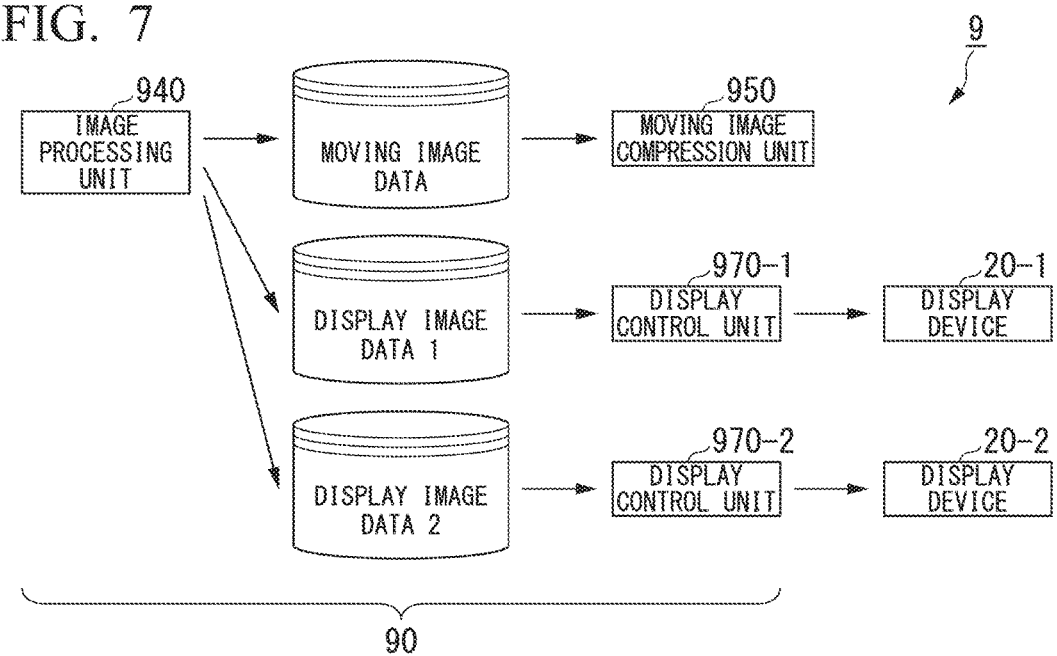
FIG. 7 is a conceptual diagram which shows an example of a processing flow in a conventional imaging system.
Figure 8:
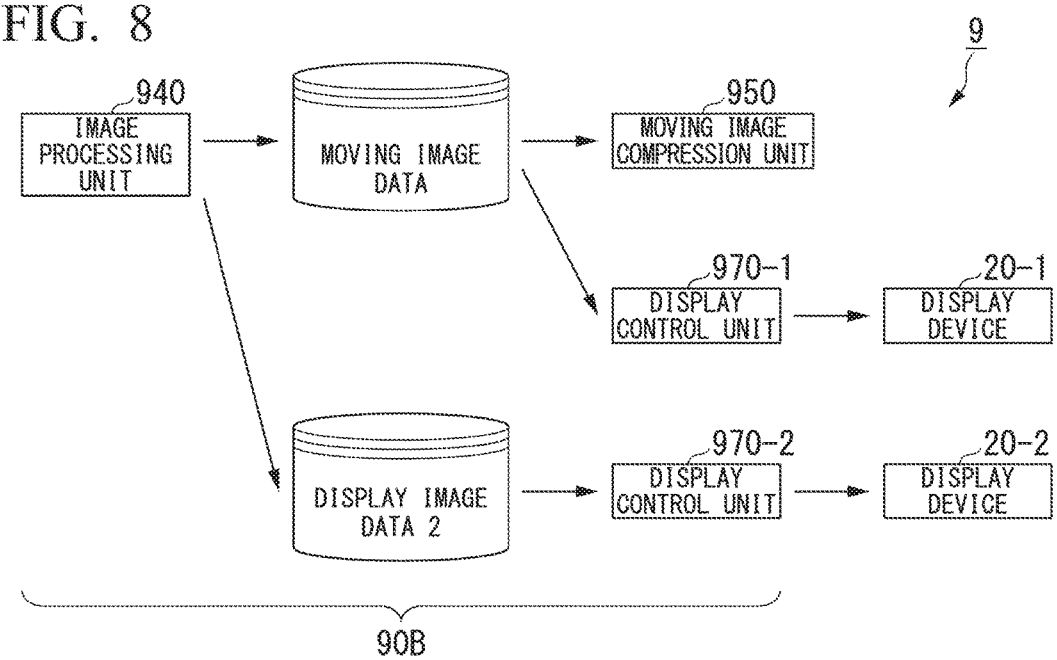
FIG. 8 is a conceptual diagram which shows another example of the processing flow in the conventional imaging system.
Figure 9:
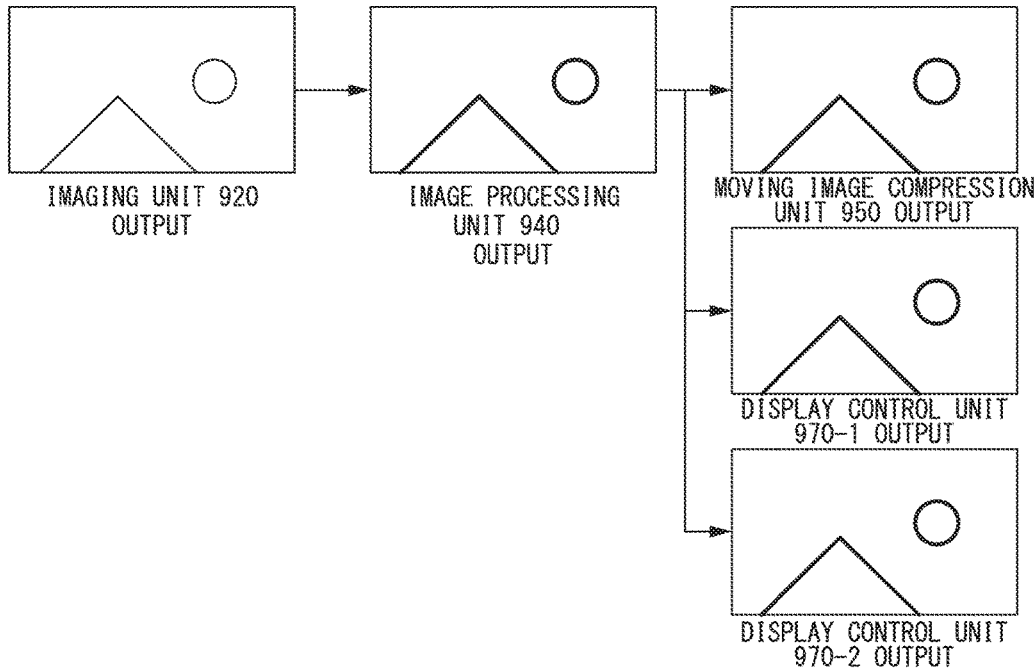
FIG. 9 is a conceptual diagram which shows an example of output data from each configuration element of the conventional imaging system.
Figure 10:
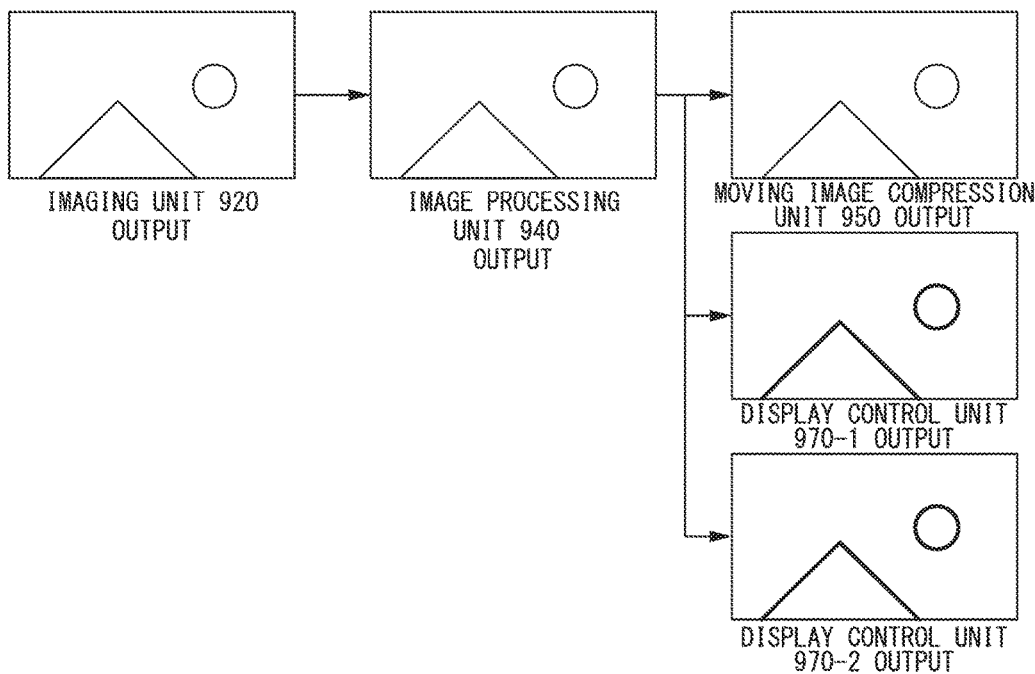
FIG. 10 is a conceptual diagram which shows another example of the output data from each configuration element of the conventional imaging system.

FIG. 6 is a schematic block diagram which shows a configuration of a display control unit 170A-1 according to the present embodiment.

The display control unit 170A-1 is configured to include image data-processing units 172A and 173, a delay adjustment unit 174, a filter-processing unit 175, and a display image generation unit 176.

The image data-processing unit 172A is configured to include FIFO write control units 1721 and 1721A, FIFO read control units 1722 and 1722A, FIFO buffers 1723 and 1723A, data array conversion units 1724 and 1724A, and data enable generation units 1725 and 1725A.

An example in which two pieces of color information data 11 and 12 constituting the image data 1 are stored in different storage areas of each SRDAM 13 will be described. The image data 1 is, for example, YC 420 plane sequential data, and the color information data 11 and 12 is Cb image data and Cr image data.

The synchronous signal generation unit 171 outputs a generated synchronous signal to the FIFO write control unit 1721, the FIFO read control unit 1722, and the data enable generation unit 1725 as a synchronous signal 11. The synchronous signal generation unit 171 sets the generated synchronous signal as a synchronous signal 12, and outputs it to a FIFO write control unit 1721A, a FIFO read control unit 1722A, and a data enable generation unit 1725A. A timing at which the synchronous signal generation unit 171 outputs the synchronous signal 11 is a time earlier than a timing at which the synchronous signal generation unit 171 outputs synchronous signals 12 and 2 by a predetermined offset time.

The FIFO write control unit 1721, the FIFO read control unit 1722, the FIFO buffer 1723, the data array conversion unit 1724, and the data enable generation unit 1725 have the same configuration as the FIFO write control unit 1721A, the FIFO read control unit 1722A, the FIFO buffer 1723A, the data array conversion unit 1724A, and the data enable generation unit 1725A, respectively. However, the FIFO write control units 1721, 1721A, and 1731 output the DMA request signal 11, the DMA request signal 12, and the DMA request signal 2 to the DMA controller 160 (refer to FIG. 1). The DMA request signal 11 indicates the color information data 11. The DMA request signal 12 indicates the color information data 12. The DMA request signal 2 indicates the image data 2.

Each of a DMA request acceptance signal 11 and a DMA data enable signal 11 is input to the FIFO write control unit 1721 as a response to the DMA request signal 11. Each of a DMA request acceptance signal 12 and a DMA data enable signal 12 is input to the FIFO write control unit 1721A as a response to the DMA request signal 12. Each of a DMA request acceptance signal 2 and a DMA data enable signal 2 is input to the FIFO write control unit 1731 as a response to the DMA request signal 2. DMA transfer data 11, 12, and 2 read from the SDRAM 130 is stored in the FIFO buffers 1723, 1723A, and 1733, respectively. The color information data 11 is output from the FIFO buffer 1723 via the data array conversion unit 1724 in synchronization with the synchronous signal 11. The color information data 12 is output from the FIFO buffer 1723A via the data array conversion unit 1724A in synchronization with the synchronous signal 12. The image data 2 is output from the FIFO buffer 1733 via the data array conversion unit 1734 in synchronization with the synchronous signal 2. The color information data 11 is delayed in line units by the delay adjustment unit 174, and is subjected to the filter processing by the filter-processing unit 175. The display image generation unit 176 generates display image data by superimposing the color information data 12 from the image data-processing unit 172A and the image data 2 from the image data-processing unit 173 on filter-processing data 11 generated by the filter-processing unit 175.

As described above, the image data 1 in the present embodiment includes a plurality of pieces of color information data 11 and 12. The image data processing unit 172A outputs the color information data 11 synchronized with the synchronous signal 11 to the delay adjustment unit 174, and the image data-processing unit 172A outputs the color information data 12 synchronized with the synchronous signal 12 to the display image generation unit 176. The synchronous signal 11 is a synchronous signal of the color information data 11. The synchronous signal 12 is a synchronous signal of the color information data 12. The synchronous signal generation unit 171 outputs the generated synchronous signals 11 and 12 to the image data-processing unit 172. The synchronous signal generation unit 171 outputs the synchronous signal 11 to the image data-processing unit 172 earlier than the synchronous signal 12 by a predetermined offset time. The delay adjustment unit 174 delays the color information data 11 from the image data-processing unit 172A for each line. The filer-processing unit 175 generates filter-processing data 11 by performing the filter processing on the color information data 11 from the delay adjustment unit 174. The display image generation unit 176 generates display image data 1 by further superimposing the color information data 12 from the image data-processing unit 172A on the filter-processing data 11 and the image data 2 from the image data-processing unit 173A.

With such a configuration, it is possible to superimpose the image data 2, the color information date 12, and the filter-processing data 11 on the color information data 12 which is a portion of the image data 1 at the same timing without including a line memory for timing adjustment. The filter-processing data 11 is obtained by performing the filter processing on the color information data 11 which is a portion of the image data 1. Accordingly, it is possible to prevent recording of the filter-processing data 11 based on the color information data 12 and suppress an increase in hardware scale. The display control unit 170-1 can reduce power consumption by omitting a line memory.

In the embodiments described above, an example in which some partial image data (first partial image data) included in the image data 1 and other partial image data (second partial image data) are the color information data 11 and the color information-data 12, respectively, is described, but the present invention is not limited thereto. For example, some partial image data, other partial image data, and the image data 2 may also be Y image data, C image data, and Y image data, respectively.

In the embodiments described above, an example in which the filter processing performed by the filter-processing unit 175 is edge-peaking processing including a product-sum operation using mainly a one-dimensional filter coefficient in line units is described, but the present invention is not limited thereto. The product-sum operation in the filter-processing unit 175 may also be a two-dimensional product-sum operation further combined with a product-sum operation in pixel units. In addition, the filter processing in the filter-processing unit 175 is not limited to processing aimed at edge peaking, but may also be processing used for processing aimed at, for example, removal of unnecessary (spurious) components, or removal or suppression of a noise component.

Some components of the imaging devices 10 and 10A according to each of the embodiments described above, for example, the image-processing unit 140, the moving image compression unit 150, the DMA controller 160, the display control units 170-1, 170A-1, and 170-2, and the control unit 180, may be realized by a computer. In this case, these may also be realized by recording a program for realizing this control function on a computer-readable recording medium and causing a computer system to read and execute the program recorded on the recording medium. "Computer system" herein is a computer system embedded in the imaging devices 10 and 10A and the computer system is configured to include hardware such as an OS and peripheral devices. "Computer-readable recording medium" is a portable medium such as a flexible disk, a magneto-optical disc, a ROM, or a CD-ROM, or a storage device such as a hard disk embedded in the computer system. Furthermore, "computer-readable recording medium" may include a constituent for dynamically holding a program for a short time such as a communication line in a case in which a program is transmitted via a network such as the Internet or a communication line such as a telephone line, and a constituent for holding a program for a certain period of time such as a volatile memory in a computer system serving as a server or a client in this case. Moreover, the program described above may be configured to realize some of the functions described above, and may also be configured to further realize the functions described above in combination with a program already recorded in the computer system.

Some or all of the imaging devices 10 and 10A according to each of the embodiments described above may also be realized as an integrated circuit such as a large-scale Integration (LSI). Each functional block of the imaging devices 10 and 10A may be individually made as a processor, and may also be made as a processor by integrating some or all functional blocks. In addition, a method of forming an integrated circuit is not limited to the LSI, and may be realized by a dedicated circuit or a general-purpose processor. Moreover, when a technology of forming an integrated circuit that replaces the LSI due to advances in semiconductor technology emerges, an integrated circuit based on the technology may be used.

In each of the embodiments described above, the display control unit 170-2 may include the same constituents as the display control unit 170-1. In each of the embodiments described above, the display control unit 170-2 may include the same constituents as the image data-processing unit 172, and the same constituents as the delay adjustment unit 174, the filter-processing unit 175, and the display image generation unit 176 may also be omitted therefrom.

In each of the embodiments described above, each of the display control units 170-1, 170A-1, and 170-2 may also be configured as a single display control device. The display control unit 170-2 may read and output the display image data 2 independently from a synchronous signal generated by the synchronous signal generation unit 171 of the display control units 170-1 and 170A-1, and may also read and output the display image data 2 in synchronization with the synchronous signal. In addition, the display control unit 170-2 may be omitted from the imaging devices 10 and 10A.

Either or both of the display devices 20-1 and 20-2 may be configured as a part of the imaging devices 10 and 10A, and may also be configured as a single display device independent from the imaging devices 10 and 10A.

Preferred embodiments of the present invention have been described above, but the present invention is not limited to these embodiments or modifications thereof. Additions, omissions, replacements, and other changes of constituents can be made within a range not departing from the spirit of the present invention. The present invention is not limited by the description above, and is limited only by the scope of the appended claims.

What is claimed is:

1. A display control device, comprising:
   a plurality of image data-processing units configured to acquire image data from a DMA bus in synchronization with a synchronous signal and the plurality of image data-processing units being configured to output the image data;
   a synchronous signal generation unit configured to generate the synchronous signal and the synchronous signal generation unit being configured to output the synchronous signal to a first image data-processing unit which is one of the plurality of image data-processing units earlier than outputting the synchronous signal to a second image data-processing unit which is another image data-processing unit by a predetermined offset time;
   a delay adjustment unit configured to delay first image data for each line, the first image data being output from the first image data-processing unit, and the first image data being in synchronization with the synchronous signal;
   a filter-processing unit configured to perform a product-sum operation as filter processing by using a filter coefficient of a predetermined number of taps and a first partial image data output from the delay adjustment unit; and
   a display image generation unit configured to generate display image data by superimposing the filter-processing data on second image data from the second image data-processing unit,
   wherein the synchronous signal is a vertical synchronous signal included in each frame,
   the synchronous signal generation unit is configured to
   output the synchronous signal to the first image data-processing unit earlier than outputting the synchronous signal to the second image data-processing unit by a predetermined offset time when the filter processing is necessary, and
   not to output the synchronous signal to the first image data-processing unit earlier than outputting the synchronous signal to the second image data-processing unit by the predetermined offset time when the filter processing is unnecessary, and
   the offset time is a time corresponding to the number of taps and a line cycle, and the offset time is within a range not exceeding a vertical retrace period determined by the vertical synchronous signal.

2. The display control device according to claim 1,
   wherein the plurality of the image data-processing units output DMA request signals to the DMA bus in synchronization with a synchronous signal generated and input from the synchronous signal generation unit.

3. An imaging device comprising the display control device described in claim 2.

4. An imaging device comprising the display control device described in claim 1.

5. The display control device according to claim 1,
   wherein the delay adjustment unit is configured to include a plurality of line memories, and
   wherein the delay adjustment unit is configured to stop an operation of the line memories included in the delay adjustment unit when the filter-processing unit does not perform the filter processing.

* * * * *